US007930710B2

(12) United States Patent
Kato et al.

(10) Patent No.: US 7,930,710 B2
(45) Date of Patent: Apr. 19, 2011

(54) PROGRAM START-UP UNIT, PROGRAM START-UP METHOD, RECORDING MEDIUM WITH START-UP PROCESSING PROGRAM RECORDED, AND INTEGRATED CIRCUIT

(75) Inventors: Kazuomi Kato, Kyoto (JP); Masashi Sugiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 1007 days.

(21) Appl. No.: 11/798,731

(22) Filed: May 16, 2007

(65) Prior Publication Data

US 2007/0288944 A1    Dec. 13, 2007

(30) Foreign Application Priority Data

May 16, 2006    (JP) .................................. 2006-136045

(51) Int. Cl.
*G06F 9/44*    (2006.01)
*G06F 9/45*    (2006.01)

(52) U.S. Cl. ...................................... 719/331; 717/162

(58) Field of Classification Search .................. 719/331
See application file for complete search history.

(56) References Cited

U.S. PATENT DOCUMENTS

| 5,475,840 | A | 12/1995 | Nelson et al. | |
| 2004/0111720 | A1* | 6/2004 | Vertes | 717/164 |
| 2004/0199908 | A1* | 10/2004 | Yoshida et al. | 717/162 |
| 2005/0108721 | A1* | 5/2005 | Oshima et al. | 719/310 |

FOREIGN PATENT DOCUMENTS

JP    7-160483    6/1995

\* cited by examiner

*Primary Examiner* — H. S. Sough
*Assistant Examiner* — Abdou K Seye
(74) *Attorney, Agent, or Firm* — Wenderoth, Lind & Ponack, L.L.P.

(57) ABSTRACT

A program start-up unit is provided which is capable of starting up a program at high speed and reducing the consumption of a memory. This program start-up unit analyzes the link relation between an application program and a shared library in the whole system, specifies a combination in which the management structure of a load state can be used in common to the utmost among application programs, and uses this management structure as a reference in the whole system.

16 Claims, 10 Drawing Sheets

FIG.8

|  | LINK NUMBER FROM APPLICATION PROGRAM | TOTAL SUBORDINATE SHARED-LIBRARY LINK NUMBER |
|---|---|---|
| SHARED LIBRARY A | 1 | 3 |
| SHARED LIBRARY B | 2 | 6 |
| SHARED LIBRARY C | 1 | 6 |
| SHARED LIBRARY D | 1 | 1 |
| SHARED LIBRARY E | 3 | 1 |
| SHARED LIBRARY F | 2 | 4 |
| SHARED LIBRARY G | 1 | 1 |
| SHARED LIBRARY H | 2 | 1 |
| SHARED LIBRARY I | 2 | 1 |
| SHARED LIBRARY J | 2 | 1 |

FIG.9

COMMON LOAD-STATE MANAGEMENT INFORMATION ~151

LINK RELATION TO SHARED LIBRARIES NECESSARY FOR APPLICATION PROGRAMS

|  | ALL THE SHARED LIBRARIES IT LINKS WITH |  |
|---|---|---|
| APPLICATION PROGRAM 1 | A D E | ~501 |
| APPLICATION PROGRAM 2 | {B E F H I J} | ~502 |
| APPLICATION PROGRAM 3 | {B E F H I J} C G | ~503 |
| ... | ... | |

---

LOAD-STATE MANAGEMENT INFORMATION USED IN COMMON BY APPLICATION PROGRAMS ~152

SHARED LIBRARY {B E F H I J}

- LOAD-STATE MANAGEMENT INFORMATION B
- LOAD-STATE MANAGEMENT INFORMATION E
- LOAD-STATE MANAGEMENT INFORMATION F
- LOAD-STATE MANAGEMENT INFORMATION H
- LOAD-STATE MANAGEMENT INFORMATION I
- LOAD-STATE MANAGEMENT INFORMATION J

~504

---

LOAD-STATE MANAGEMENT INFORMATION USED INDIVIDUALLY BY APPLICATION PROGRAMS ~153

- LOAD-STATE MANAGEMENT INFORMATION A ~510
- LOAD-STATE MANAGEMENT INFORMATION D ~511
- LOAD-STATE MANAGEMENT INFORMATION E ~512
- LOAD-STATE MANAGEMENT INFORMATION C ~513
- LOAD-STATE MANAGEMENT INFORMATION G ~514
- ...

~115

PROGRAM START-UP UNIT, PROGRAM START-UP METHOD, RECORDING MEDIUM WITH START-UP PROCESSING PROGRAM RECORDED, AND INTEGRATED CIRCUIT

BACKGROUND OF THE INVENTION

1. Field of the Invention

The present invention relates to a start-up processing technology for various programs which are executed in a computer. Particularly, it relates to the art of starting up a program at high speed and reducing the consumption of a memory used by a program when a start-up processing is executed.

2. Description of the Background Art

A multi-task type operating system (or OS) which is typified by Linux, Windows (which are registered trademarks), or the like, is installed in equipment or a computer. In such equipment, a program dynamic-loading system is generally adopted. This is a system in which a dynamic loader will not load the main body of a program, or a shared library, into an execution space and determine an execution address until this program is started up.

In general, the shared library is a program which is used in common from a plurality of programs. As a program is started up, the dynamic loader retrieves a shared library necessary for this program. Then, the dynamic loader reads or calculates information necessary for loading it from each shared library and sets such information. Sequentially, the dynamic loader loads each shared library into an execution space so that it can be executed.

In the above described dynamic-loading system, it is not until a program is started up that a load processing necessary for this program is executed. Therefore, one and the same shared library can be used in common by several programs. Besides, an improvement is given in the versatility or portability of a program or a shared library. On the other hand, every time a program is started up, a load processing is executed for a program and a shared library. This lengthens the time taken to start up a program.

Under this background, in a program start-up processing by such a dynamic-loading system, in order to execute the start-up of a program at a higher speed, a method is disclosed for obtaining an executable program image in which a designated program and a relevant library program can be dynamically linked together (e.g., refer to Japanese Patent Laid-Open No. 7-160483 specification).

Specifically, a linker (i.e., a dynamic loader) checks an image cache when a program is started up. Then, it examines whether a new program and its relevant library program are already linked up and cached because they have been executed before. If no program is in the image cache, next, the dynamic loader checks whether the relevant library program is cached in a partially-linked form. Then, it uses as many relevant library programs as it can search out. Thereby, the executable program and the executable relevant library program (or shared library) saved in a memory or a cache are reused at the next program start-up. This helps shorten the load processing.

However, according to the above described prior art, in order to execute the load processing promptly, a program and a shared library which are already subjected to a symbol-reference address resolution (i.e., a relocation) are stored in another cache. Hence, a memory capacity is separately required to cache the code and data of a program itself.

Furthermore, according to the above described prior art, a program or a shared library is cached so that the execution code of the program's body or the shared library itself can be quickly executed. However, no mention is made of load-state management information on the load of a shared library which should be managed by the dynamic loader.

This load-state management information is, for example, a piece of information used for grasping a load state: which of shared libraries necessary for a program to be now started up has been loaded, which address each shared library is disposed at, where a specific area of each shared library is disposed, or the like. It differs for each program to be started up, and thus, it needs to be managed in a start-up processing.

Therefore, even if a shared library itself is cached as an execution code which can be instantly loaded, the dynamic loader has to execute a processing for creating and managing the above described load-state management information. This raises a disadvantage in that time is required for this processing.

Moreover, different shared libraries are used by each program, and thus, this load-state management information is necessary for each program. This also presents a disadvantage in that a memory is consumed for each program.

SUMMARY OF THE INVENTION

In order to resolve the above described conventional disadvantages, it is an object of the present invention to provide a program start-up unit, a program start-up method, a recording medium in which a start-up processing program is recorded and an integrated circuit which are capable of starting up a program at high speed and reducing the consumption of a memory when a start-up processing is executed in a dynamic-loading system.

A program start-up unit according to an aspect of the present invention, which starts up a program that is executed using a shared program used in common, comprising: a common load-state management-information storage section which assorts and stores common-use load-state management information for managing the load state of a shared program used in common by each program and individual-use load-state management information for managing the load state of a shared program used individually by each program; and a load-state management-information assignment section which, when a program is started up and a shared program is loaded into an execution space: using the common-use load-state management information stored in the common load-state management-information storage section, assigns the management structure of the load state of a shared program used in common by each program to the execution space so that the management structure is referred to in common by each program; and using the individual-use load-state management information stored in the common load-state management-information storage section, assigns the management structure of the load state of a shared program used individually by each program to the execution space so that the management structure is referred to individually by each program.

According to the above described configuration, common-use load-state management information for managing the load state of a shared program used in common by each program and individual-use load-state management information for managing the load state of a shared program used individually by each program are assorted and stored. When a program is started up and a shared program is loaded into an execution space, using the stored common-use load-state management information, the management structure of the load state of a shared program used in common by each program is assigned to the execution space so that it is referred to in common by each program and using the stored individual-use load-state management information stored, the management structure of the load state of a shared program used individually by each program is assigned to the execution space so that it is referred to individually by each program. Therefore, when a program is started up, on the basis of the information assigned to the execution space, the program's start-up is executed. This makes it possible to start up the program at a higher speed and reduce the consumption of a memory.

These and other objects, features and advantages of the present invention will become more apparent upon reading of the following detailed description along with the accompanied drawings.

BRIEF DESCRIPTION OF THE DRAWINGS

FIG. 8 is a table, showing information which is obtained in the procedure given in FIG. 6 and FIG. 7 by the common link-relation extraction section shown in FIG. 2.

FIG. 9 is a representation, typifying an example of common load-state management information shown in FIG. 2.

DESCRIPTION OF THE PREFERRED EMBODIMENTS

Hereinafter, a program start-up unit according to each embodiment of the present invention will be described with reference to the attached drawings.

First Embodiment

Figure 1:
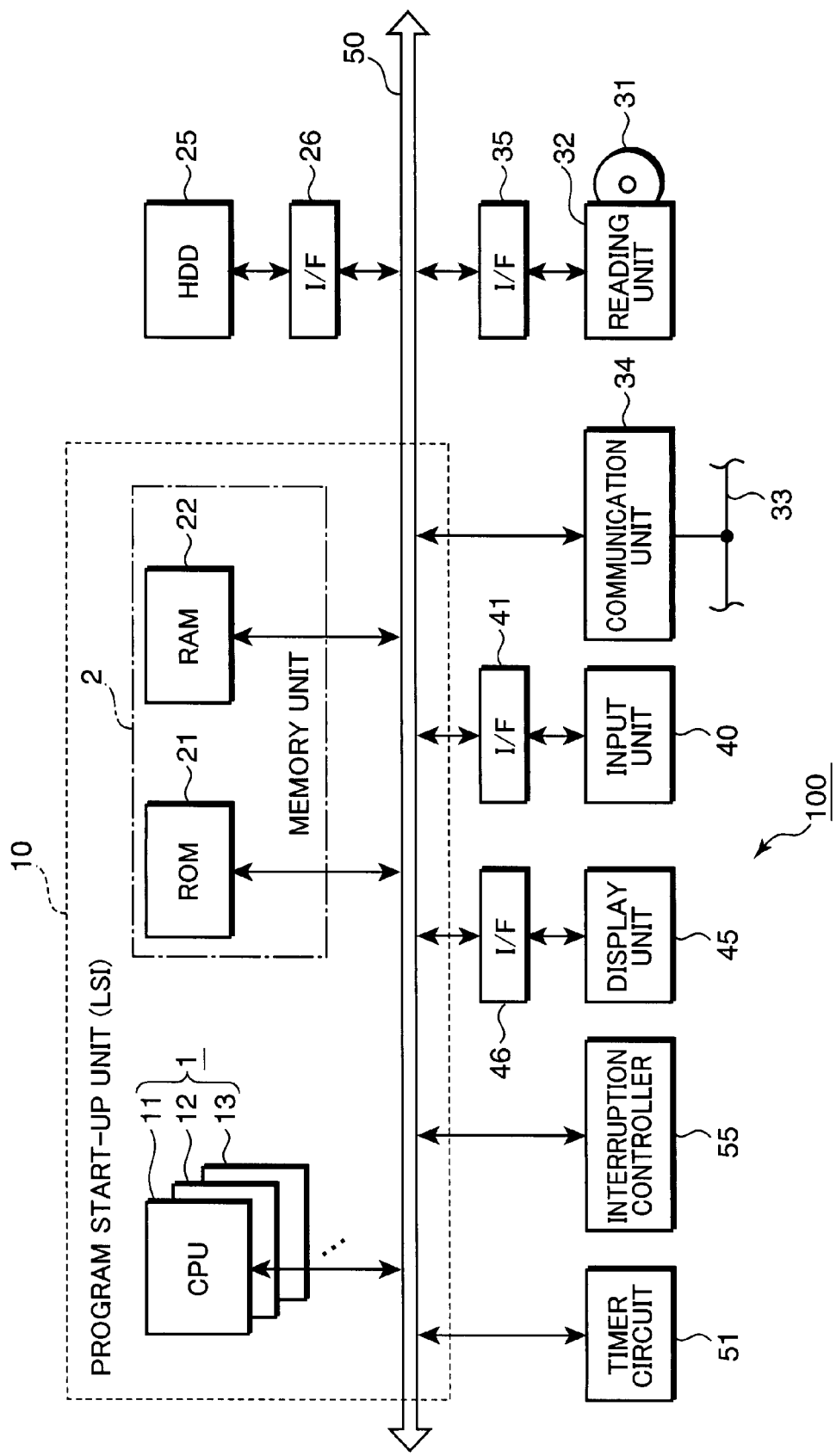
FIG. 1 is a block diagram, showing the configuration of an information processing apparatus which includes a program start-up unit according to a first embodiment of the present invention.

FIG. 1 is a block diagram, showing the configuration of an information processing apparatus which includes a program start-up unit according to a first embodiment of the present invention. Such an information processing apparatus 100 can be used by a user in itself, but it may also be incorporated in various kinds of electrical equipment. As a typical example of the information processing apparatus 100, there is a PDA (or personal digital assistant), or a portable communication terminal such as a cell phone. In a portable communication terminal, an improvement is especially required in the start-up or response performance of an application program. Hence, a faster start-up realized by a program start-up unit (described later) benefits such equipment enormously.

The information processing apparatus 100 includes: a CPU (or central processing unit) 1; a memory unit 2; a communication unit 34; an input unit 40; a display unit 45; a timer circuit 51; and an interruption controller 55. These units are mutually connected through a bus line 50. To the bus line 50, if necessary, a hard-disk unit 25 and a reading unit 32 can be connected. The hard-disk unit 25, the reading unit 32, the input unit 40 and the display unit 45 are each connected through interfaces 26, 35 and 41 to the bus line 50.

The CPU 1 may also be formed by a single CPU, or it can also be made up of a plurality of CPUs. As an example, the information processing apparatus 100 is set to include several CPUs. The memory unit 2 includes a ROM (or read-only memory) 21 and a RAM (or random-access memory) 22. In the ROM 21, a computer program is stored which specifies the operation of the CPU 1 and includes a start-up processing program or the like. The computer program can also be stored in the hard-disk unit 25.

As the need arises, the CPU 1 writes, in the RAM 22, the computer program stored in the ROM 21 or the hard-disk unit 25. Simultaneously, it executes a processing specified by the computer program. The RAM 22 also functions as a storage medium which temporarily stores data generated as the CPU 1 executes the processing. The ROM 21 also includes a non-volatile memory or storage medium, like a flash ROM, which is rewritable and can hold storage contents even if the power is shut off. The RAM 22 includes a volatile memory or storage medium which cannot hold storage contents if the power is shut off.

The hard-disk unit 25 is a unit which writes and reads the computer program or data in and from a built-in hard disk (not shown). The reading unit 32 is a unit which reads the computer program or data recorded in a recording medium 31 (e.g., a CD, a DVD, or a memory card). The communication unit 34 is a unit which exchanges the computer program or data with the outside, through a communication line 33, such as a telephone line, a network line, a radio communication and an infrared communication.

The input unit 40 is a unit which inputs data or the like through an operation by a user. For example, a keyboard disposed in a PDA, input buttons arranged in a mobile phone, or an attachable-and-detachable mouse or an attachable-and-detachable keyboard. The display unit 45 is a unit which displays data, an image or the like on a screen, or gives data or the like in an audio form. For example, it corresponds to an LCD (or liquid crystal display).

The timer circuit 51 is a unit which outputs a timer interrupt signal in a fixed cycle. The interruption controller 55 is a unit which relays, to the CPU 1, an interrupt request signal which is sent from the timer circuit 51, the input unit 40, the other CPUs than a CPU in execution of a processing among the CPUs 1, the communication unit 34 as a network device, the hard-disk unit 25, the reading unit 32 or the like. An interrupt request from each unit is given a priority level, and thus, if interruptions are simultaneously generated from a plurality of units, the interruption controller 55 has the function of mediating between those requests according to the priority level.

As described so far, the information processing apparatus 100 is configured as a computer. The above described computer program can be supplied through the ROM 21, a flexible disk (not shown), or the computer-readable recording medium 31 such as a CD-ROM. It can also be supplied through a transmission medium such as the communication line 33. For example, the computer program recorded in a CD-ROM as the recording medium 31 can be read by connecting the reading unit 32 to the information processing apparatus 100. Further, it can be stored in the RAM 22 or the hard-disk unit 25.

In the case where the computer program is supplied by the ROM 21, if this ROM 21 is mounted on the information processing apparatus 100, the CPU 1 can execute a processing in accordance with this computer program. The computer program supplied through the transmission medium such as the communication line 33 is received through the communication unit 34. For example, it is stored in the RAM 22 or the hard-disk unit 25. This transmission medium is not limited to a wired transmission medium, and thus, a radio transmission medium may also be used. Besides, the transmission medium includes not only a communication-line channel, but also a relay unit which relays a communication-line channel, for example, a router.

The program start-up unit 10 includes the CPU 1, and the memory unit 2 in which a start-up processing program (i.e., a high-speed start-up program) is stored. It is configured as a computer in itself and is incorporated into the information processing apparatus 100. Preferably, the program start-up unit 10 should be configured as an integrated circuit, such as an LSI (or large-scale integrated circuit) which is formed by embedding the CPU 1 and the memory unit 2 in a single semiconductor wafer.

Figure 2:
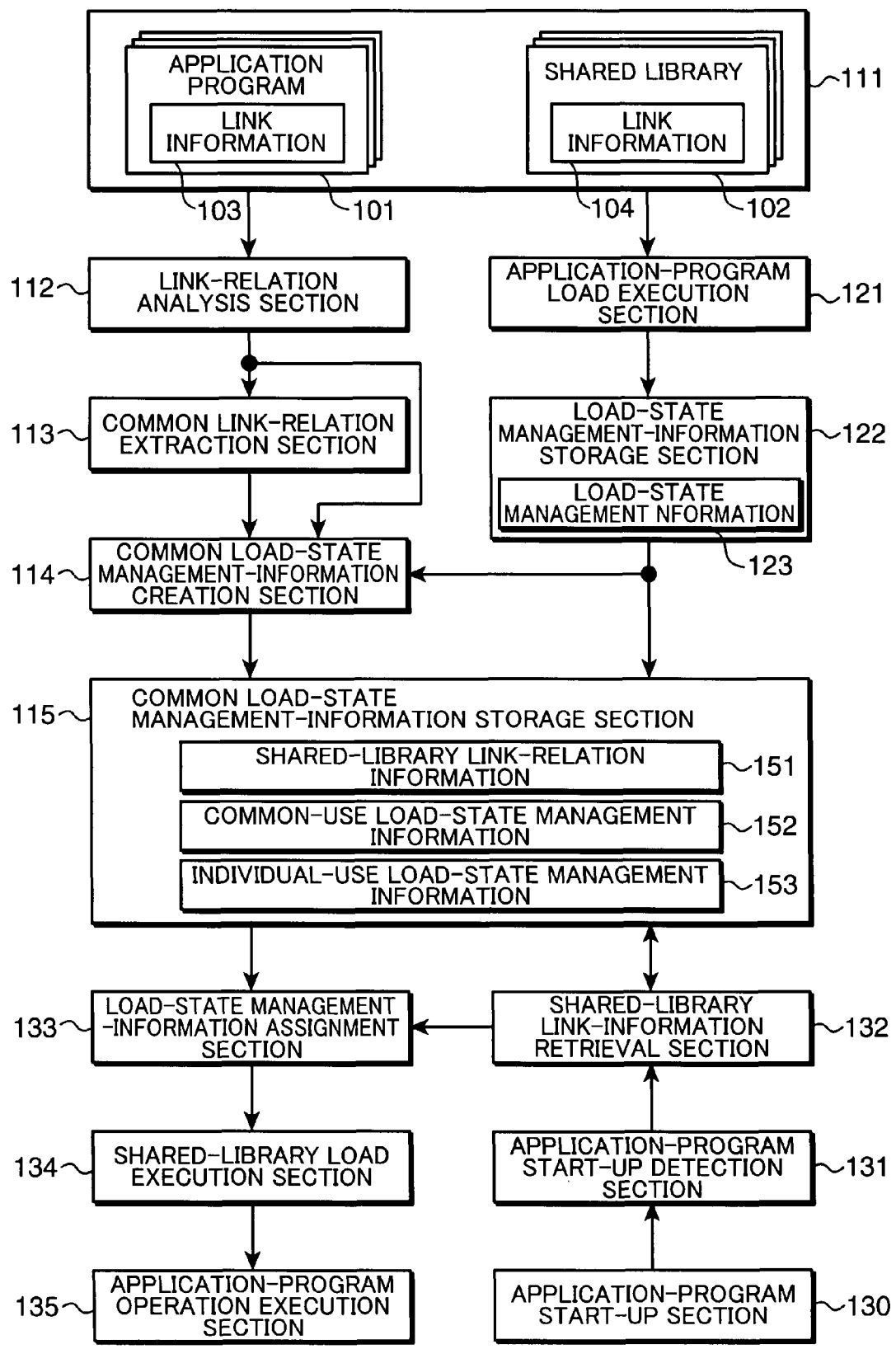
FIG. 2 is a block diagram, showing each function of the program start-up unit shown in FIG. 1.

FIG. 2 is a block diagram, showing each function of the program start-up unit 10. In the memory unit 2 are stored one or more application programs 101, or one or more shared libraries 102, and a main program (e.g., the start-up processing program) or data for realizing the program start-up unit 10. These programs or data cooperates with the CPU 1 to realize the program start-up unit 10. Specifically, the CPU 1 executes the start-up processing program stored in the memory unit 2, so that the program start-up unit 10 functions as: a program storage section 111; a link-relation analysis section 112; a common link-relation extraction section 113; a common load-state management-information creation section 114; a common load-state management-information storage section 115; an application-program load execution section 121; a load-state management-information storage section 122; an application-program start-up detection section 131; a shared-library link-information retrieval section 132; a load-state management-information assignment section 133; a shared-library load execution section 134; and an application-program operation execution section 135.

The program storage section 111 is formed by the ROM 21 of the memory unit 2 and the like. The one or more application programs 101 and the one or more shared libraries 102 are stored therein. Herein, the application program 101 is the generic name of an execution program, and thus, it may also be various kinds of middleware, a file system, or a device driver. The shared library 102 is the generic name of the one which is used in common from several of the application programs 101. Hence, it can also be adopted, as long as it is used in common.

In addition, the application program 101 and the shared library 102 are both a program which can be executed in the information processing apparatus 100. The application program 101 includes link information 103 indicating which shared library is needed among the shared libraries 102. Besides, there is a case where not only the application program 101 but also the shared library 102 itself requires another shared library. In that case, the shared library 102 holds link information 104 to another shared library. In general, such link information 103, 104 is added when each of the application program 101 and the shared library 102 is compiled and linked so as to be executable from a source file described in a specific description language.

The application-program load execution section 121 reads the application programs 101 and the shared libraries 102 which are stored in the program storage section 111. Then, it executes a load processing for each application program 101. At the time when a shared library 102 used in common from a plurality of application programs is loaded into an execution space, it stores load-state management information 123 which represents the management structure of the load state in the load-state management-information storage section 122.

The link-relation analysis section 112 refers to the link information 103, 104 stored in the program storage section 111. Then, it analyzes the link relation between the plurality of application programs 101 and the shared libraries 102 used in common from a plurality of application programs. Sequentially, it outputs information (hereinafter, referred to simply as "the structure of the link relation") which represents the structure of the link relation between the application programs and the shared libraries to the common link-relation extraction section 113 and the common load-state management-information creation section 114.

On the basis of the structure of the link relation from the link-relation analysis section 112, the common link-relation extraction section 113 extracts information on the link relation which can be used in common by a plurality of application programs. Then, it outputs the structure of the link relation which can be used in common by a plurality of application programs to the common load-state management-information creation section 114.

Based on the structure of the link relation obtained from the link-relation analysis section 112 and the information on the link relation which can be used in common by a plurality of application programs obtained from the common link-relation extraction section 113, the common load-state management-information creation section 114 creates shared-library link-relation information 151 which indicates the link relation to shared libraries necessary for application programs. Then, it stores this as the common load-state management information in the common load-state management-information storage section 115.

In addition, based on the structure of the link relation obtained from the link-relation analysis section 112 and the information on the link relation which can be used in common by a plurality of application programs obtained from the common link-relation extraction section 113, from the load-state management information 123 of the load-state management-information storage section 122, the common load-state management-information creation section 114 assorts and creates common-use load-state management information 152 which is load-state management information used in common by each application program and individual-use load-state management information 153 which is load-state management information used individually by each application program. Then, it stores it as the common load-state management information in the common load-state management-information storage section 115.

The application-program start-up detection section 131 is notified by an application-program start-up section 130 that an application program has started up. Thereby, it detects the application program being started up. Then, it notifies the shared-library link-information retrieval section 132 of information indicating which application program has been started up among the plurality of application programs 101. Incidentally, the application-program start-up section 130 is formed by the kernel of an OS (or operating system) in operation under the CPU 1. Hence, it is not indispensable as the component elements of the program start-up unit 10 shown in FIG. 1.

The shared-library link-information retrieval section 132 inquires of the common load-state management-information storage section 115 and refers to the shared-library link-relation information 151. Thereby, it grasps all the shared libraries necessary for the started-up application program. Then, it delivers, to the load-state management-information assignment section 133, the common-use load-state management information 152 used in common by the started-up application program and the individual-use load-state management information 153 used individually by the started-up application program.

If the application program has started up and the application-program start-up detection section 131 has detected the application program starting up, the load-state management-information assignment section 133 is supposed to load necessary shared libraries into an execution space. Before it loads them, in order to refer to the common-use load-state management information 152 stored in the common load-state management-information storage section 115, it assigns the management structure of the load state of the shared program which is used in common by the started-up application program to the ROM 21, the hard-disk unit 25 or the like which is a secondary storage unit. At the same time, using the individual-use load-state management information 153, in order for each application program to refer individually to it, it assigns the management structure of the load state of the shared program which is used individually by the started-up application program to the RAM 22 which is a main storage unit.

After the load-state management-information assignment section 133 has assigned the management structure of the load state of the shared program, the shared-library load execution section 134 assigns the shared library's main body to the execution space and loads it so that it can be executed. Then, the application-program operation execution section 135 executes the executable application program.

Incidentally, the processing for creating the load-state management information 123 which is executed by the application-program load execution section 121, or the processing for creating the shared-library link-relation information 151, the common-use load-state management information 152 and the individual-use load-state management information 153 which are executed by the link-relation analysis section 112, the common link-relation extraction section 113 and the common load-state management-information creation section 114, can be executed in any timing, so long as they are executed at least before the application program is started up.

In addition, there can be a case where at a manufacturing time or another such time, the shared-library link-relation information 151, the common-use load-state management information 152 and the individual-use load-state management information 153 are stored in advance in the common load-state management-information storage section 115. In that case, the following sections may also be omitted: the program storage section 111; the link-relation analysis section 112; the common link-relation extraction section 113; the common load-state management-information creation section 114; the common load-state management-information storage section 115; the application-program load execution section 121; and the load-state management-information storage section 122.

Figure 3:
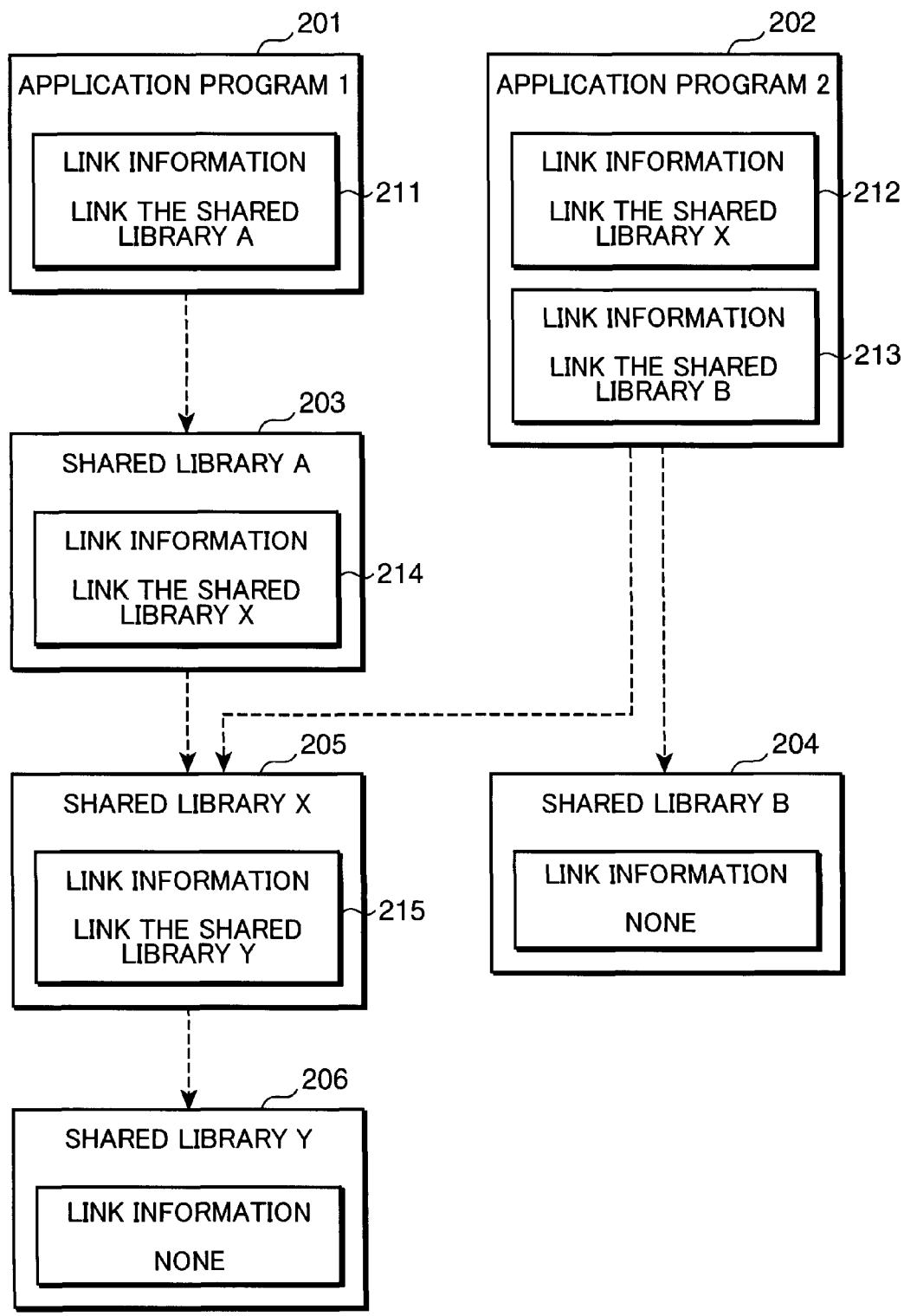
FIG. 3 is a representation, typifying an example of the link relation between application programs and shared libraries shown in FIG. 2.

Next, an example of the link relation between the application program 101 and the shared library 102 is mentioned in FIG. 3, and this link relation is explained. In FIG. 3, two application program 1 (201) and application program 2 (202) are picked up as an example of the application program 101. In the application program 1 (201), link information (211) is provided with information that a shared library A (203) is linked. On the other hand, in the application program 2 (202), link information (212, 213) is provided with information that a shared library X (205) and a shared library B (204) are linked.

Herein, in link information (214) of the shared library A (203), there is information that the shared library X (205) is linked. In the shared library X (205), a shared library Y (206) is linked from link information (215). In other words, in the example of FIG. 3, in terms of the application program 1 (201) and the application program 2 (202), as is not written in the link information 211 to 213 of the application programs themselves, the shared library X (205) and the shared library Y (206) are linked, respectively. In general, a plurality is used as the application program 101 and the shared library 102, and thus, their link relation becomes complicated, compared with the example of FIG. 3.

In a conventional start-up processing, in general, when an application program is started up, a dynamic loader retrieves a shared library necessary for the application program. Then, it loads the code, data or the like of the shared library into an execution space for this application program. In the example of FIG. 3, a dynamic loader loads the shared libraries A (203), X (205), Y (206) necessary for the application program 1 (201) into an execution space. In order to manage the load state, it creates load-state management information about the shared libraries A (203), X (205), Y (206). Besides, the dynamic loader loads the shared libraries B (204), X (205), Y (206) necessary for the application program 2 (202) into the execution space. In order to manage the load state, it creates load-state management information about the shared libraries B (204), X (205), Y (206).

Figure 4:
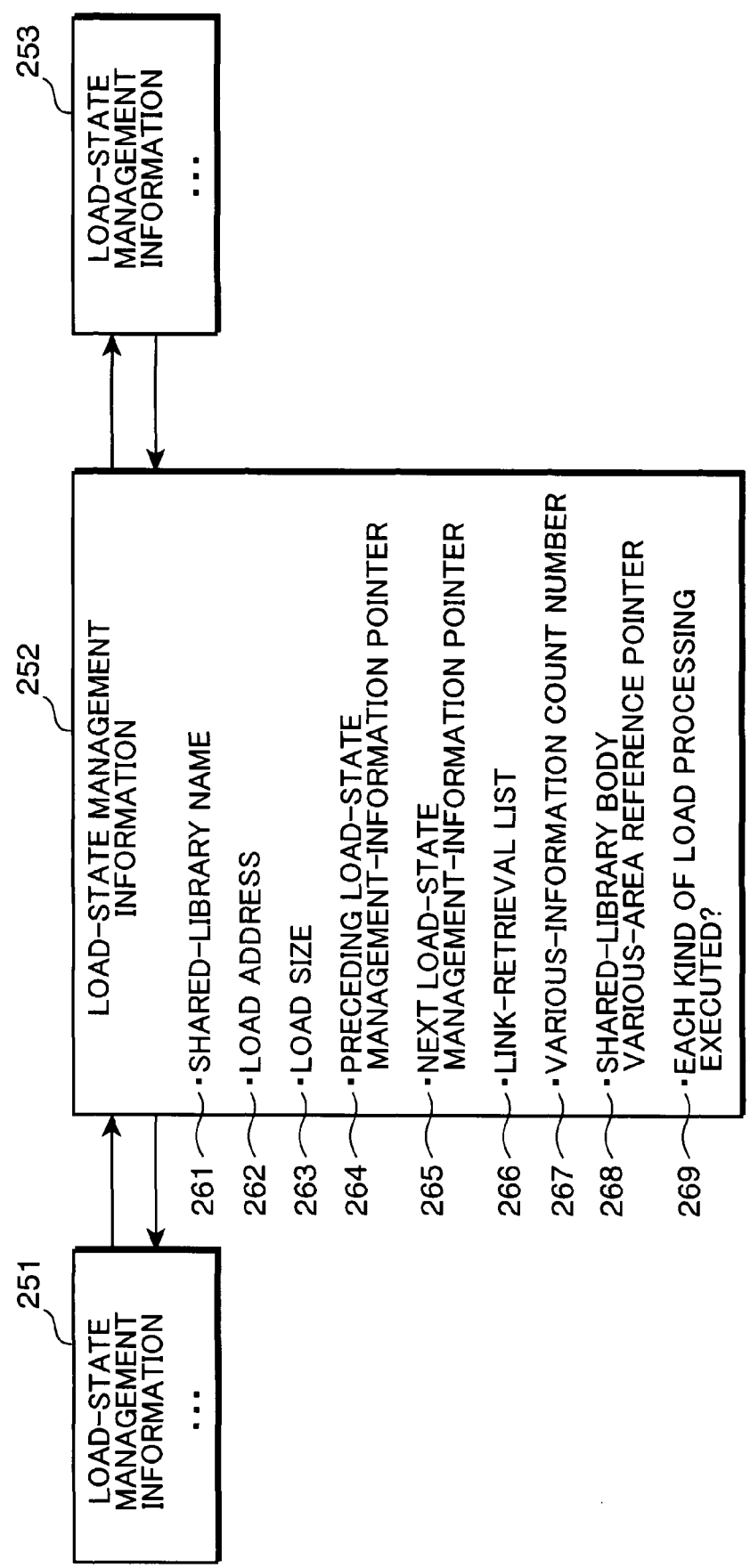
FIG. 4 is a representation, showing an example of load-state management information about the application programs and shared libraries shown in FIG. 2.

In this way, in the conventional start-up processing, shared libraries to be linked to an application program vary, and thus, load-state management information is retrieved and created for each application program by the dynamic loader. FIG. 4 shows an example of such load-state management information.

In the example of FIG. 4, load-state management information 252 includes such information as described below. First, in the load-state management information 252, there is a shared-library name 261 indicating which shared library is loaded. Such load-state management information is created for each shared library.

Furthermore, in the load-state management information 252, there is a pointer 264 which indicates its preceding load-state management information 251, or a pointer 265 which indicates the next load-state management information 253. The load state of a shared library loaded into the execution space of an application program is managed in the form of a list. Moreover, in the load-state management information 252, there is a load address 262 indicating at which address the entity of a shared library is loaded into the execution space of an application program, and a load size 263 which indicates how large area is occupied by a loaded shared library in the execution space of an application program.

In addition, in the load-state management information 252, there is a link-retrieval list 266 which indicates a list of other shared libraries linked by a shared library, or a list on which a dynamic loader retrieves shared libraries already loaded into the execution space. Besides, a count number 267 of each kind of information includes the reference count of a loaded shared library or a count number relating to the configuration of the program body of a shared library. For example, it includes the number of program headers, an entry number of a dynamic section, or the like.

Furthermore, a reference pointer 268 to various pieces of information in the body of a shared library is a pointer to information included in the program body of a loaded shared library. For example, there are enumerated a pointer to a program header, a pointer to a dynamic section, a pointer to a symbol hash table, and the like. Besides, information which indicates that an execution code is already relocated when a dynamic loader loads a shared library in an execution space, information which indicates that the shared library has been initialized, or the like, is managed as information on whether or not each kind of load processing has been executed 269.

Incidentally, the contents of the load-state management information 252 mentioned in FIG. 4 are merely an example. Hence, the contents of the load-state management information are not necessarily limited, as long as when an application program and a shared library are loaded in an execution space, it is information necessary for managing their load state.

As described earlier, in the conventional start-up processing, a dynamic loader will not retrieve shared libraries necessary for an application program, read information about each shared library and load it into an execution space, and create load management information, until this application program is started up. In contrast, before an application program is started up, the application-program load execution section 121 shown in FIG. 2 creates the load-state management information 123 about the application program and a shared library and stores it in the load-state management-information storage section 122. Therefore, according to this embodiment, when an application program is practically started up, this load-state management information 123 is reused. This helps execute the application-program start-up processing at high speed.

In other words, when an application program is started up, the application-program load execution section 121 executes a processing equivalent to a load processing for a shared library which is executed by a dynamic loader. Then, it obtains the load-state management information 123 which represents the management structure of the load state, and stores it in the common load-state management-information storage section 115. This load-state management information 123 (i.e., the management structure of the load state) includes the load-state management information 251 to 253 illustrated in FIG. 4. When an application program is started up, it is needed for managing the load state of a shared library.

By the way, it is typically preferable that the application-program load execution section 121 executes a load processing for all of the application programs 101 and acquires the management structure of the load state of all the application programs and all the shared libraries. However, it may also acquire the management structure of the load state of a part of the application programs and the shared libraries. Besides, the application-program load execution section 121 may also be embodied using a dynamic loader itself which is actually used. Or, it may also be embodied using a program which simulates the operation of a dynamic loader actually used.

The load-state management-information storage section 122 stores, as the load-state management information 123 about the application programs and the shared libraries, the management structure of the load state of all the application programs and the shared libraries subjected to the load processing by the application-program load execution section 121, using the same structure as the structure used when the application program is started up. Incidentally, in terms of where the load-state management information 123 is stored, any place may be used, so long as it can be temporarily stored there. The load-state management-information storage section 122 is not especially limited, and thus, it may also be the ROM 21 or the RAM 22 in the memory unit 2, the hard-disk unit 25 which is the secondary storage unit, or the recording medium 31 which can be read and written through the reading unit 32.

Herein, when an application program is started up, if the load-state management information 123 about the application program and a shared library is reused as it is, the speed of the start-up becomes higher. However, if the aggregation of load-state management information about different shared libraries for each application program is stored in a memory or each type of recording medium, then load-state management information about one and the same shared library is overlapped and held by application programs. This consumes the memory capacity greatly.

Therefore, in this embodiment, the link-relation analysis section 112 shown in FIG. 2 refers to the link information 103, 104 stored in the program storage section 111. Then, it extracts the structure of the link relation between the application program 101 and the shared library 102. On the basis of this link-relation structure, the common link-relation extraction section 113 extracts information on the link relation usable in common by a plurality of application programs. In order to make each piece of load-state management information usable in the whole system, based on the information on the link relation usable in common by the plurality of application programs and the load-state management information 123 about the application program and the shared library, the common load-state management-information creation section 114 creates the common load-state management information 151 to 153. Then, it stores this in the common load-state management-information storage section 115.

Herein, if the common load-state management information 151 to 153 is stored only in the RAM 22 which is a volatile memory, then every time the power of the information processing apparatus 100 is turned on, the common load-state management information 151 to 153 has to be created again. Therefore, in order to hold the common load-state management information 151 to 153 regardless of the power's ON/OFF, preferably, the common load-state management-information storage section 115 should be formed by a non-volatile memory, for example, the ROM 21. Besides, among the pieces of common load-state management information 151 to 153, only the common-use load-state management information 152 may also be stored in the ROM 21. In this case, there is no need to re-create the common-use load-state management information 152 which is used most frequently. This makes it possible to reduce the ROM's 21 capacity to the utmost and speed up the start-up processing at the power-on time. Incidentally, on the assumption that the common load-state management information 151 to 153 is re-created every time the power is turned on, the common load-state management-information storage section 115 may also be formed by the RAM 22 which is a volatile memory.

In general, when a dynamic loader creates load-state management information, an area for the load-state management information is secured in a RAM which is a volatile memory as a temporary storage area. Then, it is assigned for the memory management so as to be accessible from an execution space for each application program. On the other hand, the program start-up unit 10 holds the common load-state management information 151 to 153 in the ROM 21 which is a non-volatile memory. Thereby, the RAM 22 as a volatile memory is designed not to be consumed.

However, in a general memory-management method, the area of a ROM or a RAM is divided into each area size (e.g., page size) in a specific unit and is assigned to an execution space for each application program. Accordingly, if load-state management information about shared libraries is individually assigned for the memory management, much waste can be caused.

In addition, ordinarily, even if a shared library common to application programs is loaded, the load state is managed in the order different from each other. For example, in the example of FIG. 3, the application program 1 (201) and the application program 2 (202) both link the shared library X (205) and the shared library Y (206). But taking the link order into account, the application program 1 (201) creates load-state management information in order of the shared library A (203), the shared library X (205), the shared library Y (206). On the other hand, the application program 2 (202) is likely to create load-state management information in order of the shared library X (205), the shared library B (204), the shared library Y (206).

In contrast, the entire common load-state management information on a ROM can also be assigned to an execution space for each application program through the memory management and be set to be referred to by any application program. In that case, only a reference pointer for load-state management information is set to point the corresponding load-state management information among the pieces of common load-state management information.

Nevertheless, in the above described method, load-state management information about many shared libraries unnecessary for an application program is assigned to the execution space. This enables needless access. For example, in the example of FIG. 3, load-state management information about the shared library B (204) unnecessary for the application program 1 (201) is assigned to the execution space, so that it is accessible. If such needless access is allowed, that raises disadvantage in that a deterioration in security or a redundant bug can be brought about.

Therefore, in the program start-up unit 10, the link-relation analysis section 112 analyzes the link information 103, 104 of the application program 101 and the shared library 102 of FIG. 2. Then, it outputs the structure of the link relation between the application program and the shared library. In accordance with this link-relation structure, the common link-relation extraction section 113 extracts a common link relation so that load-state management information can be used in common by application programs as much as possible.

As described in the example of FIG. 3, ordinarily, the link information 103, 104 represents only a link relation necessary for each of the application program 101 and the shared library 102. Hence, from only information about an individual application program or an individual shared library, all the link relations necessary for the application program cannot be obtained. Thus, the link-relation analysis section 112 analyzes the link relation and outputs the link-relation structure. An example of this link-relation structure is shown in FIG. 5.

Figure 5:
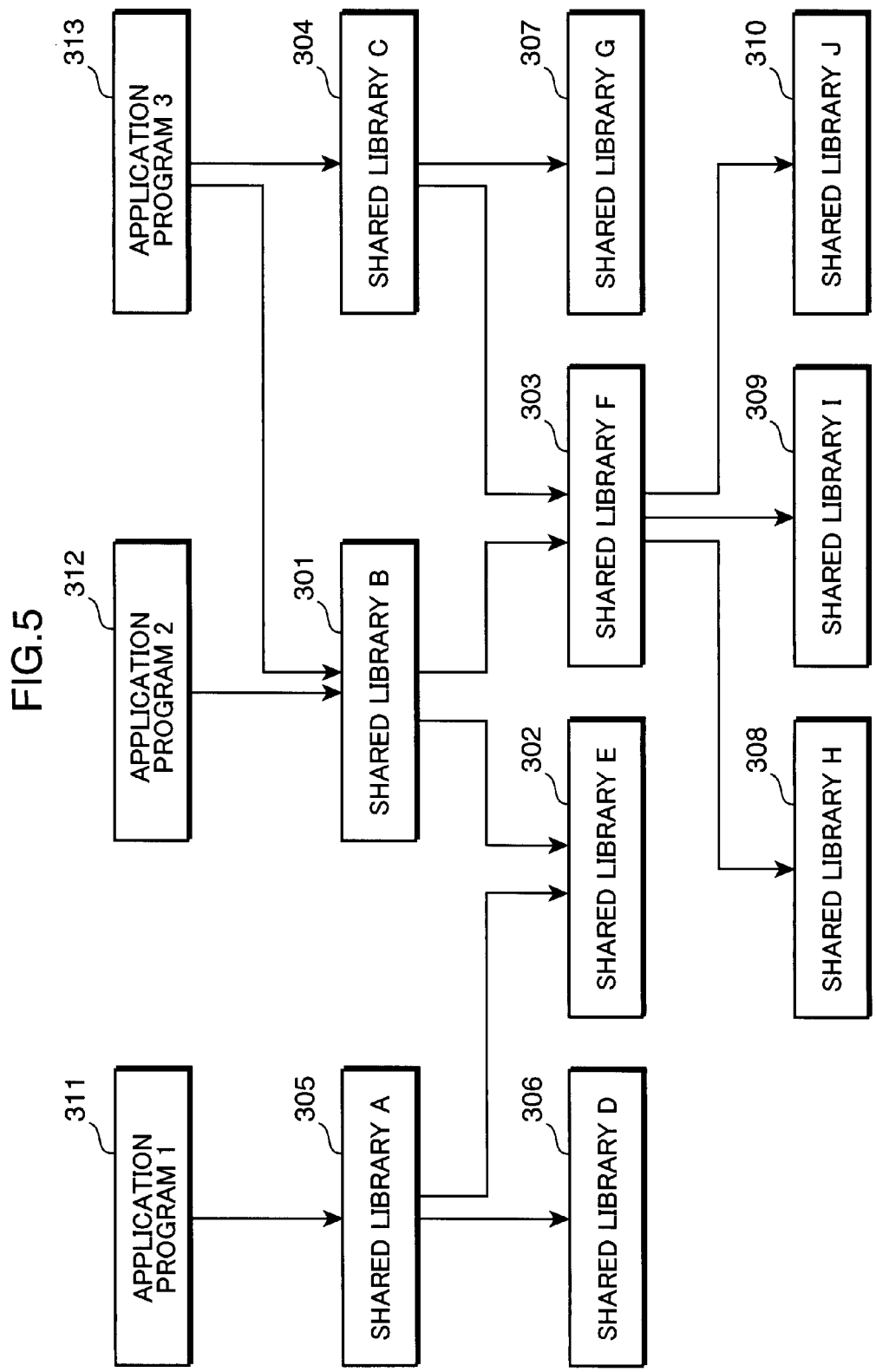
FIG. 5 is a representation, typifying an example of the structure of the link relation between the application programs and shared libraries shown in FIG. 2.

FIG. 5 shows the structure of the link relations between three application programs and ten shared libraries in total to be linked thereto. In this example, it can be seen that a shared library B (301), a shared library E (302) or a shared library F (303) are used in common by those application programs. Incidentally, the link-relation structure of FIG. 5 is merely one example, and thus, the link-relation structure varies according to the makeup of the application program 101 or the shared library 102.

If the processing of the link-relation analysis section 112 is completed and the link-relation structure is outputted, the common link-relation extraction section 113 extracts information on the common link relation so that the load-state management information can be used in common by the application programs as much as possible. Then, it notifies the common load-state management-information creation section 114 of the extraction result.

Herein, the common link-relation extraction section 113 needs to comprehend what extent the load-state management information can be used in common to among the application programs. For example, to what extent is each shared library linked by the application programs? Or, to what extent is the link relation of a shared library developed in subordination to this shared library? If such a question has been grasped, it can be known which shared-library group should be extracted so that the link relation becomes most common in the whole system.

Figure 6:
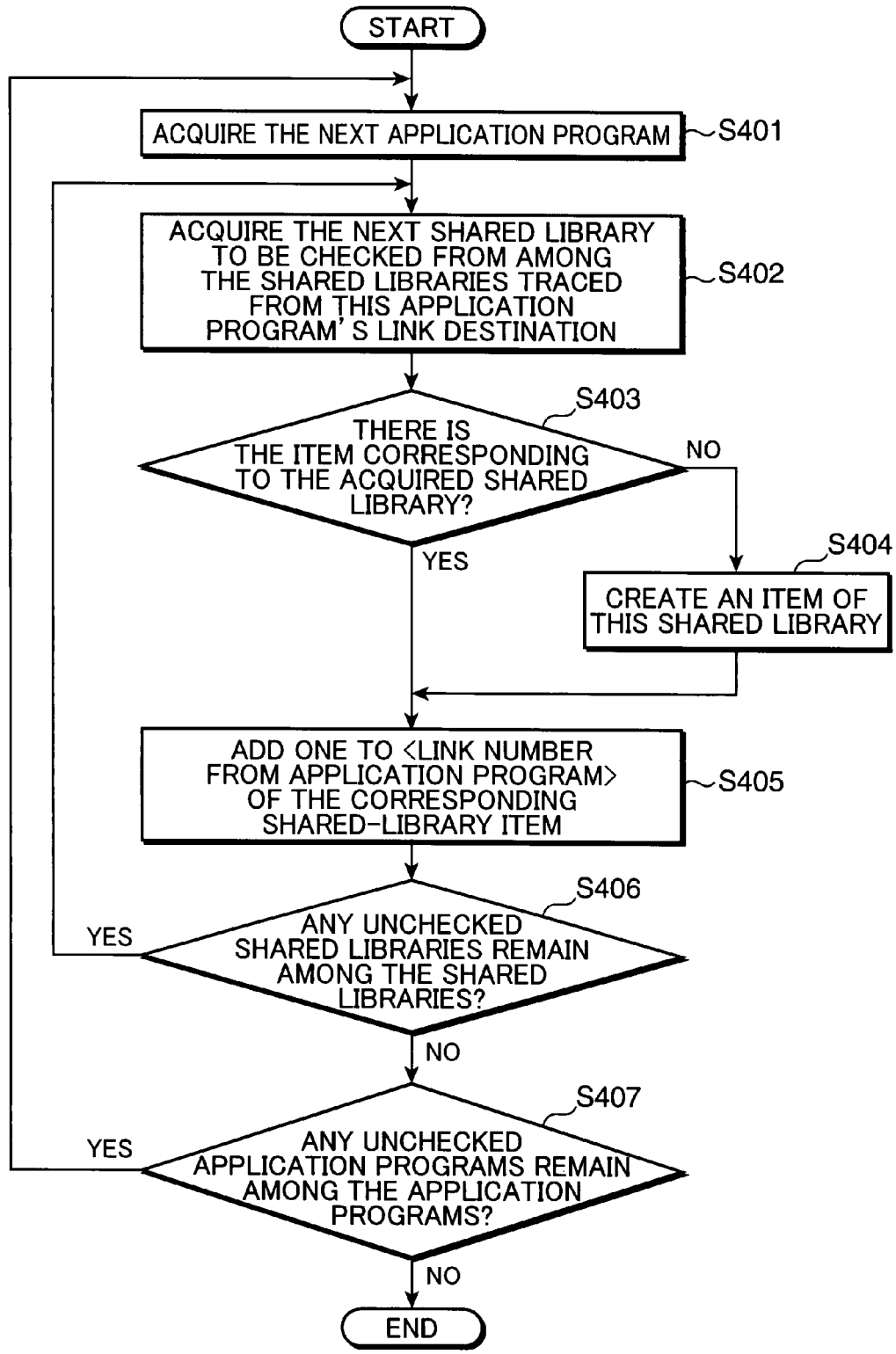
FIG. 6 is a flowchart, showing an example of the operation procedure of a common link-relation extraction section shown in FIG. 2.

FIG. 6 shows an example of the flow of a processing for, when the structure of a link relation is given, examining what extent each shared library is linked to by the application programs, using the common link-relation extraction section 113.

First, the common link-relation extraction section 113 acquires an unchecked application program, from the structure of a link relation received from the link-relation analysis section 112 (in a step S401). Next, based on the link-relation structure, the common link-relation extraction section 113 acquires an unchecked shared library from among shared libraries which are traced from where the acquired application program is linked (in a step S402). Herein, the common link-relation extraction section 113 manages the number of links to each item of the shared library.

Next, the common link-relation extraction section 113 confirms whether there is the item corresponding to the shared library acquired at the step S402 (in a step S403). Sequentially, if the common link-relation extraction section 113 decides that the item of the shared library at the step S403 already lies among the items of the shared library under the management (Yes at the step S403), then it adds one, as the link number from the application program, to the corresponding item of the shared library (in a step S405).

On the other hand, if the common link-relation extraction section 113 decides that the item of the shared library at the step S403 does not lie (No at the step S403), it creates this shared-library item (in a step S404). Then, it adds one, as the link number from the application program, to the corresponding shared-library item (in the step S405).

Next, the common link-relation extraction section 113 decides whether any unchecked shared libraries remain among the linked shared libraries (in the step S406). At the step S406, if the common link-relation extraction section 113 decides that an unchecked shared library remains (Yes at the step S406), the processing returns to the step S402.

On the other hand, at the step S406, if the common link-relation extraction section 113 decides that no unchecked shared library remains (No at the step S406), it decides whether any unchecked application programs remain among the application programs which can be acquired from the link-relation structure (in the step S407). At the step S407, if the common link-relation extraction section 113 decides that an unchecked application program remains (Yes at the step S407), the processing returns to the step S401. On the other hand, at the step S407, if the common link-relation extraction section 113 decides that no unchecked application program remains (No at the step S407), the processing comes to an end.

Figure 7:
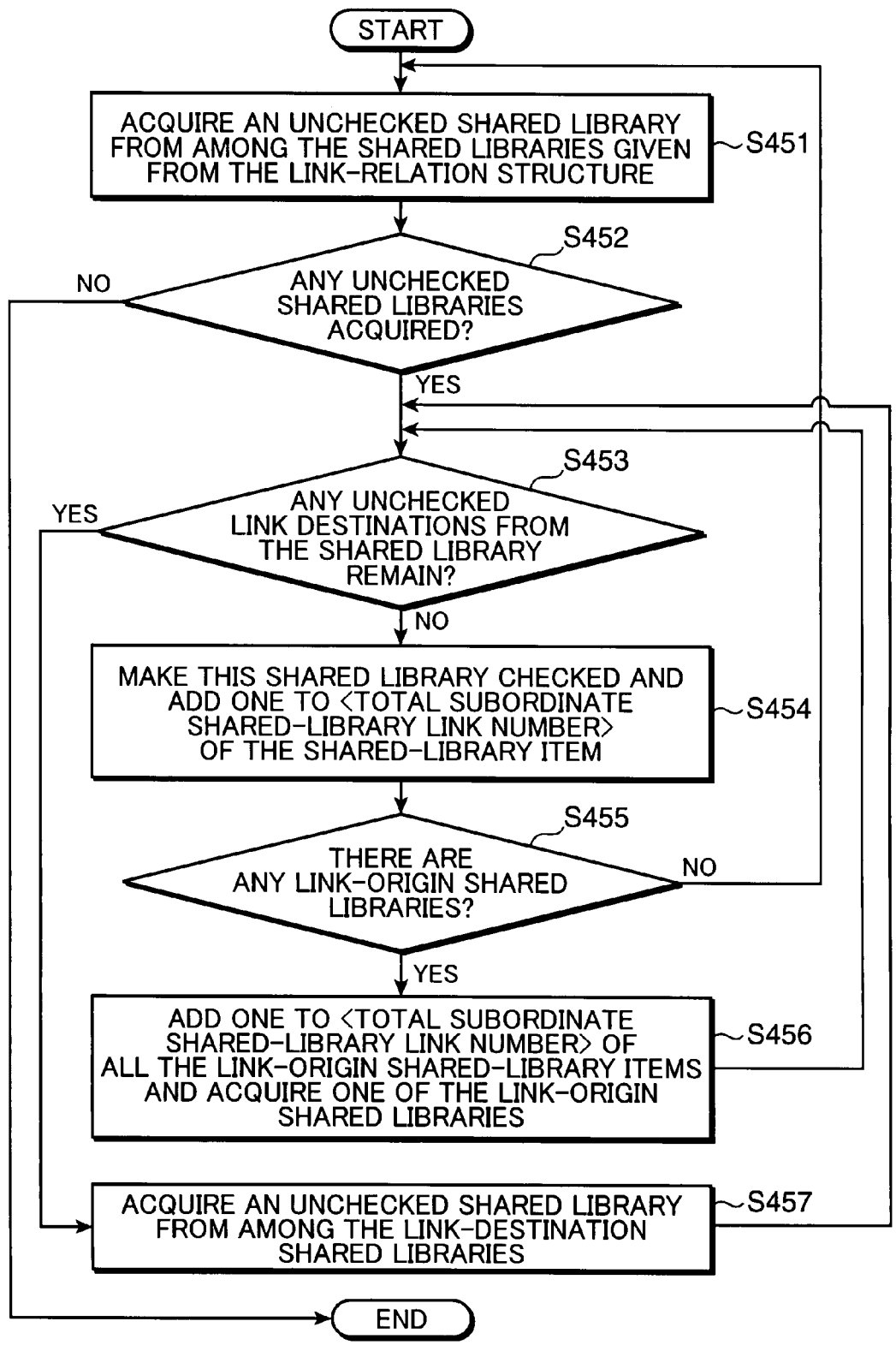
FIG. 7 is a flowchart, showing an example of the operation procedure of the common link-relation extraction section shown in FIG. 2.

Next, FIG. 7 shows an example of the flow of a processing for examining what extent the link relation of a shared library is developed to in subordination to this shared library.

First, the common link-relation extraction section 113 acquires an unchecked shared library from among shared libraries included in the structure of a link relation received from the link-relation analysis section 112 (in a step S451). Next, if the common link-relation extraction section 113 cannot acquire an unchecked shared library (No at a step S452), the processing is terminated. On the other hand, if it can acquire an unchecked shared library (Yes at the step S452), it decides whether any link destinations from the acquired shared library to unchecked shared libraries remain (in a step S453).

If an unchecked link destination remains (Yes at the step S453), the common link-relation extraction section 113 acquires an unchecked shared library from among the link-destination shared libraries (in a step S457), the processing of the step S453 and its following steps is executed. On the other hand, at the step S453, if the common link-relation extraction section 113 decides that no unchecked link destination remains (No at the step S453), it regards this shared library as already checked. Then, it adds one to the corresponding shared-library item as the total subordinate shared-library link number (in a step S454).

Next, the common link-relation extraction section 113 decides whether there are any link-origin shared libraries (in a step S455). If the common link-relation extraction section 113 decides that there is no link-origin shared library (No at the step S455), the processing of the step S455 and its following steps is executed. On the other hand, at the step S455, if the common link-relation extraction section 113 decides that there is a link-origin shared library (Yes at the step S455), it adds one to the shared-library items of all the link origins to this shared library as the total subordinate shared-library link number, and acquires one of the link-origin shared libraries (in a step S456). Then, the processing of the step S453 and its following steps is executed.

In this way, according to this embodiment, through the processing of the common link-relation extraction section 113 shown in FIG. 6 and FIG. 7, information can be calculated for comprehending which shared-library group should be extracted so that the link relation can be used in common at the maximum in the whole system. Incidentally, the processing flows shown in FIG. 6 and FIG. 7 are only an illustration of the processing of the common link-relation extraction section 113. Thus, a processing which has the same contents may also be executed using another flow.

If the above described processing of FIG. 6 and FIG. 7 is applied, for example, to the link-relation structure illustrated in FIG. 5, then the information shown in FIG. 8 is obtained. FIG. 8 shows the number of links from application programs and the total number of subordinate shared-library links to each item of shared libraries A to J. As can be seen from FIG. 8, in the example of FIG. 5, the shared library E (302) has the largest link number from application programs, and is linked from all the three application programs of an application program 1 (311), an application program 2 (312), an application program 3 (313). Hence, from the point of view of which extent a shared library is used to from application programs, the common link-relation extraction section 113 can decide that the shared library E (302) is most easily used.

As can also be seen from FIG. 8, in the example of FIG. 5, the two of a shared library B (301) and a shared library C (304) have the largest subordinate shared-library link number including the shared library itself. Both of them finally link the total six shared libraries including itself, respectively.

Specifically, in terms of the shared library B (301) and the shared library C (304), when they are loaded into the execution space of the application programs, the total six shared libraries including itself are loaded into the execution space, respectively. From the point of view of which extent a shared library is used to, the common link-relation extraction section 113 can decide that the shared library B (301) and the shared library C (304) load the most shared libraries.

In this way, on the basis of the information of FIG. 8, the common link-relation extraction section 113 is designed to extract a group of shared programs in which the link relation can be used in common at the maximum in the entire system. Typically, in order for many application programs to use a shared library and load many shared libraries, the link number from application programs and the total number of subordinate shared-library links shown in FIG. 8 are multiplied together to obtain the product. Then, a method can be adopted of choosing a shared library which has the maximum product value.

In the case where this method is used, in the example of FIG. 8, in terms of the shared library E (302 of FIG. 5) linked from all the three application programs, its subordinate shared-library link total number is one, and thus, the product is three. On the other hand, in terms of the shared library B (301 of FIG. 5) and the shared library C (304 of FIG. 5), the total six shared libraries are both loaded into the execution space. The shared library C (304 of FIG. 5) is linked from only one application program, and thus, the product is six, while the shared library B (301 of FIG. 5) is linked from two application programs, and thus, the product is twelve.

Therefore, the common link-relation extraction section 113 applies the same selection reference to information about another shared library. In the example of FIG. 8, the shared library B can be chosen as the maximum shared library. After choosing the maximum shared library, on the basis of the link-relation structure, the common link-relation extraction section 113 traces all the shared libraries linked from the selected maximum shared library. Thereby, it can extract a group of shared programs in which the link relation becomes most common in the whole system.

In the example of FIG. 5, the common link-relation extraction section 113 the six shared libraries of the shared library B (301), the shared library E (302), the shared library F (303), the shared library H (308), the shared library I (309), the shared library J (310) can be extracted as the most common shared-library group.

Incidentally, FIG. 5 and FIG. 8 are merely an illustration for explaining the processing of the common link-relation extraction section 113. Thus, the information shown in FIG. 5 and FIG. 8 varies according to the configuration of the application program 101 or the shared library 102. Besides, the link number from application programs and the total number of subordinate shared-library links are used as an index of the extraction, but another index may also be used. Further, a method is given of executing such an extraction using the product of these two indexes. However, another method can also be considered, such as using only either of the indexes, weighting either or both of the indexes with a predetermined factor.

After the above described processing is completed, as shown in FIG. 2, the common link-relation extraction section 113 extracts the most common library group. Then, it notifies the common load-state management-information creation section 114. On the basis of the library group delivered from the common link-relation extraction section 113, the link-relation structure delivered from the link-relation analysis section 112 and the load-state management information 123 of the application programs and the shared libraries which is stored in the load-state management-information storage section 122, the common load-state management-information creation section 114 creates the common load-state management information 151 to 153 and stores it in the common load-state management-information storage section 115.

This common load-state management information 151 to 153 is made up of: the shared-library link-relation information 151 which indicates the link relation to the shared library necessary for application programs; the common-use load-state management information 152 which is load-state management information used in common by application programs; and the individual-use load-state management information 153 which is load-state management information used individually by application programs.

The shared-library link-relation information 151 is created based on the link-relation structure. Specifically, the common load-state management-information creation section 114 traces all the link-destination shared libraries from the application programs which are included in the link-relation structure. Thereby, information about all the shared libraries which are loaded into the execution space when the application programs are started up and whose load state has to be finally managed, can be given for each application program.

In addition, at this time, on the basis of information about the library group delivered from the common link-relation extraction section 113, the common load-state management-information creation section 114 adds, to the items of the application programs which link with this library group, library-group identification information to that effect. As the library-group identification information, various identification information can be used, such as enclosing a library group with a predetermined identification mark so that each application program can specify the library group among the shared libraries used by the application program, and in the case where there are a plurality of library groups, adding identification information for specifying each library group.

FIG. 9 shows an example of the common load-state management information 151 to 153 stored in the common load-state management-information storage section 115. The shared-library link-relation information 151 which indicates the link relation to the shared libraries necessary for the application programs 1 to 3 of FIG. 9 includes information which indicates that all the shared libraries required by the application program 1 are the shared library A, the shared library D and the shared library E (501). On the other hand, all the shared libraries required by the application program 2 are a library group B, E, F, H, I, J. Simultaneously, the load-state management information about these shared libraries can be identified as usable in common in the whole system. For example, as the library-group identification information, brackets { } are added so that the library group B, E, F, H, I, J is designed to be identifiable (502).

The common-use load-state management information 152 which is the load-state management information used in common by application programs is created by: choosing the pieces of load-state management information about a library group extracted by the common link-relation extraction section 113 from the load-state management information 123 about the application programs and the shared libraries; and works up them into one. In the example of FIG. 9, the shared libraries B, E, F, H, I, J are transferred as the library group from the common link-relation extraction section 113. Then, the load-state management information about the shared libraries B, E, F, H, I, J is picked up and arranged in order from the load-state management information 123 about the application programs and the shared libraries (504).

As the individual-use load-state management information 153 which is the load-state management information used individually by the application programs, the load-state management information other than the load-state management information which is chosen from the load-state management information 123 about the application programs and the shared libraries is held when the common-use load-state management information 152 is created which is used in common by the application programs. In the example of FIG. 9, the load-state management information about the shared libraries A, D, E, C, G and the like is stored, except for the shared libraries B, E, F, H, I, J.

In a conventional start-up processing, in general, when an application program is started up, a dynamic loader executes a processing for loading a shared library. On the other hand, in the program start-up unit 10 according to this embodiment, as shown in FIG. 2, the application-program start-up section 130 starts up an application program. When the application program has been started up, the application-program start-up detection section 131 detects the application program starting up. Then, it notifies the shared-library link-information retrieval section 132 of information indicating which application program has been started up. The shared-library link-information retrieval section 132 inquires of the common load-state management-information storage section 115 and refers to the shared-library link-relation information 151 which indicates the link relation to the shared library necessary for application programs. Thereby, without retrieving the link relation, it can grasp all the shared libraries necessary for the started-up application program.

In addition, among the shared libraries necessary for the started-up application program, if there is the library-group identification information indicating the shared-library group whose load-state management information is used in common by the application programs in the shared-library link-relation information 151, the shared-library link-information retrieval section 132 reads the load-state management information used in common by the application programs from the common-use load-state management information 152, and delivers it to the load-state management-information assignment section 133. Besides, as the remaining load-state management information, the shared-library link-information retrieval section 132 reads the load-state management information used individually by the application programs for each shared library from the individual-use load-state management information 153. Then, it delivers this load-state management information to the load-state management-information assignment section 133.

If it is given the load-state management information used in common by the application programs from the shared-library link-information retrieval section 132, the load-state management-information assignment section 133 assigns the load-state management information in a non-volatile memory (e.g., the ROM 21) to the load-state management structure of the execution space so that it can be directly referred to in the memory management. Besides, if it is given the individual pieces of load-state management information for each shared library from the shared-library link-information retrieval section 132, the load-state management-information assignment section 133 copies each piece of load-state management information in a volatile memory (e.g., the RAM 22). Then, it assigns the copy's destinations to the individual load-state management structures of the execution space.

After the load-state management-information assignment section 133 builds the load-state management structure of the shared library, on the basis of its load-state management information, the shared-library load execution section 134 assigns and loads the shared library's body to the execution space so that it becomes executable. Then, the application-program operation execution section 135 executes the operable application program.

Through the above described processing, in this embodiment, the common-use load-state management information 152 for managing the load state of a shared library used in common by each application program and the individual-use load-state management information 153 for managing the load state of a shared library used individually by each application program are assorted and stored in the common load-state management-information storage section 115. When an application program is started up and a shared library used by the application program is loaded into an execution space, the management structure of the load state of a shared library used in common by each application program is assigned to the execution space so that the stored common-use load-state management information 152 can be referred to. Therefore, when an application program is started up, on the basis of the information assigned to the execution space, the application program's start-up is executed. This makes it possible to start up the application program at a higher speed and reduce the consumption of a memory used as the execution space.

Second Embodiment

If another application program or shared library is added to the above described information processing apparatus 100, when the added application program is started up, the state of a load needs to be freshly managed. At the same time, when the added shared library is loaded, the load state has to be additionally managed. Furthermore, if a correction is made in the application programs or shared libraries of the information processing apparatus 100, when the corrected application program is started up, the load-state management needs to be modified. Simultaneously, when the corrected shared library is loaded, the load state has to be modified. Moreover, if an application program or a shared library is deleted in the information processing apparatus 100, the load-state management at the time when the unnecessary application program is started up needs to be deleted. Then, the load state at the time when the unnecessary shared library is loaded has to be deleted.

In order to cope with such modifications as described above, a program start-up unit according to a second embodiment of the present invention is capable of, even if a program such as an application program and a shared library provided in the information processing apparatus 100 is subjected to an update such as an addition, a modification and a deletion, updating common load-state management information in response to that program updating, starting up an application program at a higher speed and reducing the consumption of a memory.

Specifically, the program start-up unit according to the second embodiment of the present invention has the same hardware configuration as the program start-up unit 10 shown in FIG. 1. For example, even if the information processing apparatus 100 shown in FIG. 1 receives information on the update of a program, a program to be updated or a part of it via the communication unit 34 from the communication line 33 such as an external network line and a radio, an application program can be started up at a higher speed and the consumption of a memory can be reduced.

Figure 10:
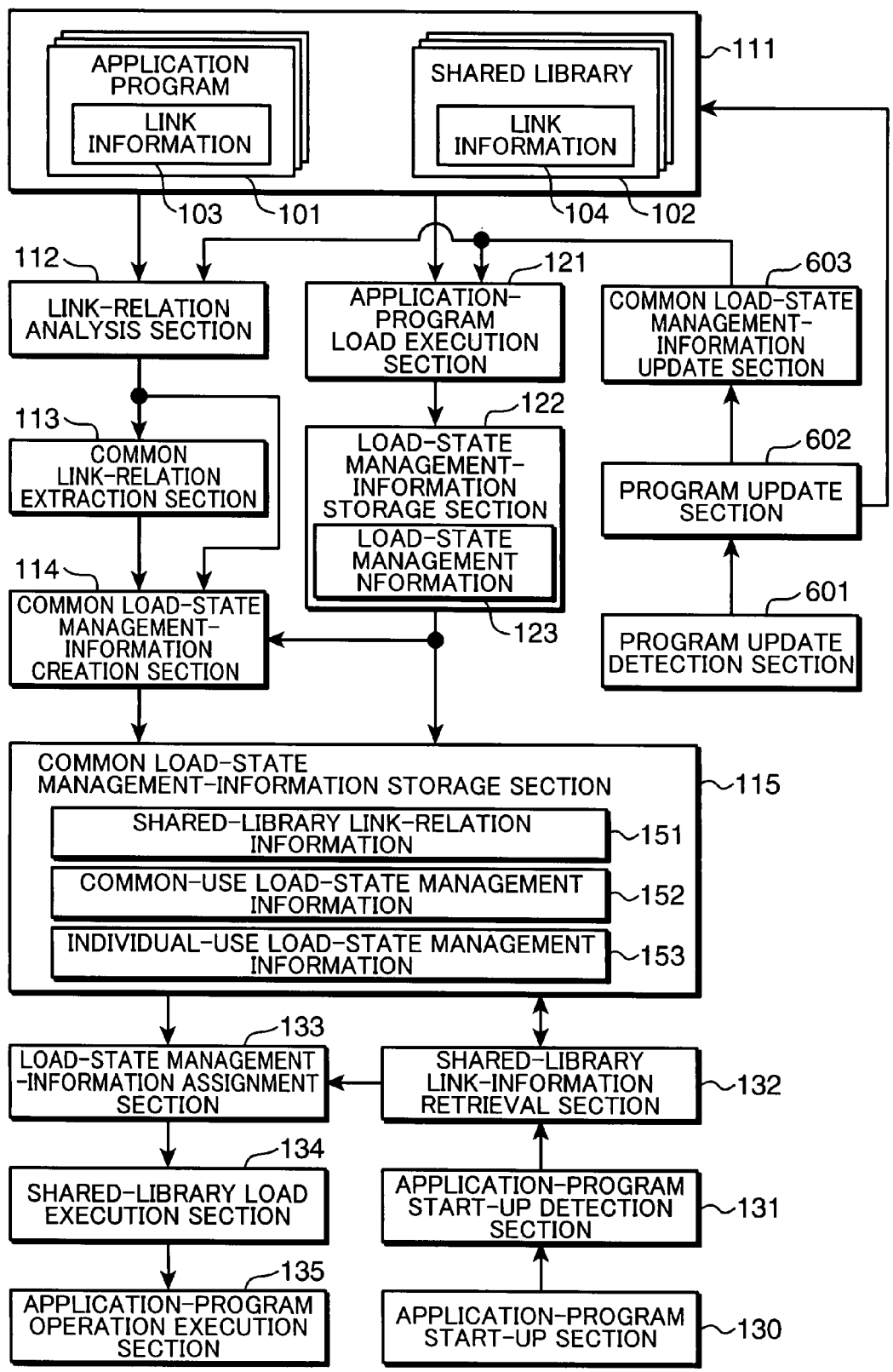
FIG. 10 is a block diagram, showing each function of a program start-up unit according to a second embodiment of the present invention.

FIG. 10 shows the configuration of the program start-up unit according to the second embodiment of the present invention. The program start-up unit shown in FIG. 10 is configured by adding a program update detection section 601, a program update section 602 and a common load-state management-information update section 603 to the configuration of the program start-up unit according to the first embodiment of the present invention shown in FIG. 2. The identical sections are given the same reference numerals, and thus, their detailed description is omitted.

The CPU 1 shown in FIG. 1 executes a start-up processing program according to the second embodiment which is stored in the memory unit 2, so that the program start-up unit 10 shown in FIG. 10 functions as: the program storage section 111; the link-relation analysis section 112; the common link-relation extraction section 113; the common load-state management-information creation section 114; the common load-state management-information storage section 115; the application-program load execution section 121; the load-state management-information storage section 122; the application-program start-up detection section 131; the shared-library link-information retrieval section 132; the load-state management-information assignment section 133; the shared-library load execution section 134; the application-program operation execution section 135; the program update detection section 601; the program update section 602; and the common load-state management-information update section 603.

Through the communication unit 34 from the communication line 33 shown in FIG. 1, the program update detection section 601 detects the fact that a program (e.g., an application program or a shared library) of the information processing apparatus 100 is to be updated. Then, it receives the program's update information, the program to be updated, or a part of it. The program update detection section 601 notifies the program update section 602 that the program is to be updated. Then, it sends the program's update information, the program to be updated or a part of it to the program update section 602.

In accordance with the program's update information received from the program update detection section 601, the program update section 602 updates the application program 101 and/or the shared library 102 which is stored in the program storage section 111 formed by the memory unit 2 of the information processing apparatus 100. After the program has been updated, the program update section 602 notifies the common load-state management-information update section 603 that the program's update is completed.

If it is notified that the program's update is completed, the common load-state management-information update section 603 notifies the link-relation analysis section 112 and the application-program load execution section 121 to execute a start-up processing again in the same way as the first embodiment.

The application-program load execution section 121 notified by the common load-state management-information update section 603 uses the updated application program 101 and shared library 102 and executes a processing for loading the application program. Then, it creates the load-state management information 123 about the updated application program and shared library and stores it in the load-state management-information storage section 122.

In addition, the link-relation analysis section 112 notified by the common load-state management-information update section 603 analyzes a link relation based on link information about the updated application program 101 and shared library 102. Then, it outputs the structure of the link relation between each program which has been updated to the common link-relation extraction section 113 and the common load-state management-information creation section 114.

The common link-relation extraction section 113 extracts a common link relation so that the load-state management information can be used in common between the application programs as much as possible in the whole information processing apparatus 100. Then, it delivers it to the common load-state management-information creation section 114. Using the updated common link relation and the load-state management information 123 about the updated application program and shared library, the common load-state management-information creation section 114 creates the updated common load-state management information 151 to 153. Then, it stores this information in the common load-state management-information storage section 115. Their detailed operation is similar to the contents described in the first embodiment.

As described above, in the program start-up unit according to the second embodiment, even if a program of the information processing apparatus 100 is updated through the communication line 33 or the recording medium 31 from the outside, then with this update as a trigger, the common load-state management information 151 to 153 can be updated in computer-incorporated equipment, such as an information device, an AV system, a communication device and a household appliance, which is provided with the information processing apparatus 100. This makes it possible to start up a program at a higher speed and reduce the consumption of a memory.

Incidentally, each functional block of FIG. 2 which shows the first embodiment of the present invention and FIG. 10 which shows the second embodiment is typically realized using a program. However, they may also be an LSI which is an integrated circuit. Each of them can also be realized individually with one chip, or a part or the whole of them may also be realized with a single chip. Herein, the integrated circuit is an LSI, but according to the difference in the degree of integration, it is often referred to as an IC, a system LSI, a super LSI or an ultra LSI.

Furthermore, such an integrated-circuit method is not limited to an LSI, and thus, it may also be realized with a dedicated circuit or a general-purpose processor. Besides, after the manufacture of an LSI, an FPGA (or field programmable gate array) which is programmable, or a reconfigurable processor which can reconfigure the connection or setting of a circuit cell inside of an LSI, can also be used.

Moreover, if an advanced semiconductor technology or its derivative technique produces an integrated-circuit art which replaces an LSI, then as a matter of course, the functional blocks may also be integrated using such an art. For example, the application of biotechnology or the like is feasible.

Hereinbefore, the above description is merely illustrations of the present invention in all respects, and thus, its scope is not supposed to be limited. Needles to say, diverse improvements or variations can be conducted without departing from the scope of the present invention.

Taking each embodiment described so far into account, the present invention is summed up as described below. Specifically, the program start-up unit according to the present invention which starts up a program that is executed using a shared program used in common, comprising: a common load-state management-information storage section which assorts and stores common-use load-state management information for managing the load state of a shared program used in common by each program and individual-use load-state management information for managing the load state of a shared program used individually by each program; and a load-state management-information assignment section which, when a program is started up and a shared program is loaded into an execution space: using the common-use load-state management information stored in the common load-state management-information storage step, assigns the management structure of the load state of a shared program used in common by each program to the execution space so that the management structure is referred to in common by each program; and using the individual-use load-state management information stored in the common load-state management-information storage step, assigns the management structure of the load state of a shared program used individually by each program to the execution space so that the management structure is referred to individually by each program.

The program start-up method according to the present invention for starting up a program which is executed using a shared program used in common, comprising: a common load-state management-information storage step of assorting and storing common-use load-state management information for managing the load state of a shared program used in common by each program and individual-use load-state management information for managing the load state of a shared program used individually by each program; and a load-state management-information assignment step of, when a program is started up and a shared program is loaded into an execution space: by using the common-use load-state management information stored in a common load-state management-information storage section, assigning the management structure of the load state of a shared program used in common by each program to the execution space so that the management structure is referred to in common by each program; and by using the individual-use load-state management information stored in the common load-state management-information storage section, assigning the management structure of the load state of a shared program used individually by each program to the execution space so that the management structure is referred to individually by each program.

The computer-readable recording medium according to the present invention is a recording medium adapted to store a start-up processing program, the start-up processing program being for starting up a program which is executed using a shared program used in common, wherein the start-up processing program allows a computer to function as: a common load-state management-information storage section which assorts and stores common-use load-state management information for managing the load state of a shared program used in common by each program and individual-use load-state management information for managing the load state of a shared program used individually by each program; and a load-state management-information assignment section which, when a program is started up and a shared program is loaded into an execution space: using the common-use load-state management information stored in the common load-state management-information storage section, assigns the management structure of the load state of a shared program used in common by each program to the execution space so that the management structure is referred to in common by each program; and using the individual-use load-state management information stored in the common load-state management-information storage section, assigns the management structure of the load state of a shared program used individually by each program to the execution space so that the management structure is referred to individually by each program.

The integrated circuit according to the present invention which starts up a program that is executed using a shared program used in common, comprising: a common load-state management-information storage section which assorts and stores common-use load-state management information for managing the load state of a shared program used in common by each program and individual-use load-state management information for managing the load state of a shared program used individually by each program; and a load-state management-information assignment section which, when a program is started up and a shared program is loaded into an execution space: using the common-use load-state management information stored in the common load-state management-information storage section, assigns the management structure of the load state of a shared program used in common by each program to the execution space so that the management structure is referred to in common by each program; and using the individual-use load-state management information stored in the common load-state management-information storage section, assigns the management structure of the load state of a shared program used individually by each program to the execution space so that the management structure is referred to individually by each program.

According to each such configuration as described above, common-use load-state management information for managing the load state of a shared program used in common by each program and individual-use load-state management information for managing the load state of a shared program used individually by each program are assorted and stored. When a program is started up and a shared program is loaded into an execution space, using the stored common-use load-state management information, the management structure of the load state of a shared program used in common by each program is assigned to the execution space so that it is referred to in common by each program and, using the stored individual-use load-state management information stored, the management structure of the load state of a shared program used individually by each program is assigned to the execution space so that it is referred to individually by each program. Therefore, when a program is started up, on the basis of the information assigned to the execution space, the program's start-up is executed. This makes it possible to start up the program at a higher speed and reduce the consumption of a memory.

It is preferable that when a program is started up and a shared program is loaded into an execution space, the load-state management-information assignment section assign the management structure of the load state of a shared program used in common by each program to the execution space, so that the common-use load-state management information stored in the common load-state management-information storage section is referred to in common by each program.

In this case, the management structure of the load state of a shared program used in common by each program is assigned to the execution space, so that the stored common-use load-state management information is referred to by each program. This makes it possible to start up the program at a higher speed and reduce the consumption of a memory used as the execution space.

It is preferable that the above described program start-up unit, further comprise: a link-relation analysis section which analyzes the link relation between a program and a shared program and creates a structure of the link relation between the programs; a common link-relation extraction section which extracts information on the link relation usable in common by a plurality of programs, based on the structure of the link relation created by the link-relation analysis section; a load-state management-information storage section which stores load-state management information that represents the management structure of the load state at the time when a program and a shared program are loaded into an execution space; and a common load-state management-information creation section which, on the basis of the information on the link relation obtained from the common link-relation extraction section, assorts the common-use load-state management information and the individual-use load-state management information from the load-state management information of the load-state management-information storage section, and stores the common-use load-state management information and the individual-use load-state management information in the common load-state management-information storage section.

In this case, the link relation between a program and a shared, program is analyzed and a structure of the link relation between the programs is created. Then, information on the link relation usable in common by a plurality of programs is extracted based on the created structure of the link relation. Next, load-state management information is stored which represents the management structure of the load state at the time when a program and a shared program are loaded into an execution space. Then, on the basis of the information on the link relation usable in common by the plurality of programs, the common-use load-state management information and the individual-use load-state management information are assorted from the stored load-state management information and are stored in the common load-state management-information storage section. Therefore, the load state can be managed in common as much as possible for each program. Hence, the common-use load-state management information which is common as much as possible can be referred to, thus reducing the consumption of a memory.

It is preferable that: on the basis of the information on the link relation obtained from the common link-relation extraction section, the common load-state management-information creation section create shared program link-relation information which represents the link relation with a shared program necessary for executing a program, and store this shared program link-relation information in the common load-state management-information storage section; and the program start-up unit further comprise a start-up detection section which detects a program being started up, and a link-information retrieval section which specifies all the shared programs necessary for executing the program detected by the start-up detection section by referring to the shared program link-relation information stored in the common load-state management-information storage section, and outputs the common-use load-state management information used in common by this program and the individual-use load-state management information used individually by the program from the common load-state management-information storage section to the load-state management-information assignment section.

In this case, on the basis of the information on the link relation obtained from the common link-relation extraction section, shared program link-relation information which represents the link relation with a shared program necessary for executing a program is created and stored in the common load-state management-information storage section. Then, all the shared programs necessary for executing the started-up program are specified by referring to the shared program link-relation information stored in the common load-state management-information storage section. Sequentially, the common-use load-state management information used in common by this program and the individual-use load-state management information used individually by the program are outputted from the common load-state management-information storage section to the load-state management-information assignment section. Therefore, when a program is started up, the common-use load-state management information used in common by this program and the individual-use load-state management information used individually by the program can be easily assorted and obtained. This helps assign the load-state management structure of a shared program used in common by each program and the load-state management structure of a shared program used individually by each program at high speed to the execution space.

It is preferable that: on the basis of the structure of the link relation created by the link-relation analysis section, the common link-relation extraction section extract a group of shared programs to which this link relation is most common; and the common load-state management-information creation section read the load-state management information about the group of shared programs extracted by the common link-relation extraction section from the load-state management-information storage section, collect this load-state management information as the common-use load-state management information and store the load-state management information in the common load-state management-information storage section.

In this case, a group of shared programs to which this link relation is most common is extracted on the basis of the structure of the link relation. Then, the load-state management information about the extracted group of shared programs is collected as the common-use load-state management information and is stored in the common load-state management-information storage section. Therefore, the load-state management information becomes as common as possible, and in this state, the load state can be managed. This makes it possible to further reduce the consumption of a memory.

It is preferable that the common link-relation extraction section extract the group of shared programs, based on at least either of the number of links to each shared program by a program and the total number of links to each shared program by a subordinate shared program thereof.

In this case, the group of shared programs is extracted based on at least either of the number of links to each shared program by a program and the total number of links to each shared program by a subordinate shared program thereof. Therefore, the shared-program group to which the link relation becomes most common can be extracted in a simple processing.

It is preferable that on the basis of the structure of the link relation created by the link-relation analysis section, the common link-relation extraction section: calculate the number of links to a shared program by a program and a subordinate link number made when one is added to the total number of links to a shared program by a subordinate shared program thereof; specify a shared program having the maximum value when both are multiplied together as the maximum shared program; and extract this maximum shared program and a subordinate shared program of the maximum shared program as the group of shared programs.

In this case, the number of links to each shared program by a program and a subordinate link number made when one is added to the total number of links to a shared program by a subordinate shared program thereof are calculated, and a shared program which has the maximum value when both are multiplied together is specified as the maximum shared program. Then, this maximum shared program and a subordinate shared program of the maximum shared program are extracted as the group of shared programs. Therefore, the shared-program group to which the link relation becomes most common can be precisely extracted.

It is preferable that: the common load-state management-information creation section stores the shared program link-relation information with the addition of identification information for specifying the group of shared programs in the common load-state management-information storage section; and the link-information retrieval section refer to the identification information, and output the common-use load-state management information used in common by the program detected by the start-up detection section from the common load-state management-information storage section to the load-state management-information assignment section.

In this case, the shared program link-relation information is stored with the addition of identification information specifiable the group of shared programs. Then, this identification information is referred to, and the common-use load-state management information is outputted from the common load-state management-information storage section to the load-state management-information assignment section. Therefore, the shared-program group can be easily specified and outputted to the load-state management-information assignment section.

It is preferable that: the common load-state management-information storage section include a non-volatile memory; and the non-volatile memory store the common-use load-state management information.

In this case, even if the unit's power is turned off, the common-use load-state management information is held in the non-volatile memory. Therefore, the unit's power is turned on, the common-use load-state management information can be instantly used.

It is preferable that the non-volatile memory include a rewritable read-only memory.

In this case, even if the unit's power is turned off, the common-use load-state management information is held in the rewritable read-only memory. Therefore, the unit's power is turned on, the common-use load-state management information can be instantly used.

It is preferable that: the common load-state management-information storage section include a volatile memory; and the volatile memory store the individual-use load-state management information.

In this case, the individual-use load-state management information is stored in the volatile memory. Therefore, the individual-use load-state management information which should be updated in accordance with a program to be started up can be properly updated at high speed.

It is preferable that the volatile memory includes a random-access memory.

In this case, the individual-use load-state management information is stored in the random-access memory. Therefore, the individual-use load-state management information which should be updated in accordance with a program to be started up can be properly updated at high speed.

It is preferable that the above described program start-up unit further comprise: a program storage section which stores a program and a shared program; and a load execution section which creates load-state management information that represents the management structure of the load state at the time when the program and the shared program stored in the program storage section are loaded into an execution space, and stores the load-state management information in the load-state management-information storage section.

In this case, the load-state management information which represents the management structure of the load state at the time when the program and the shared program stored in the program storage section are loaded into an execution space is created and stored in the load-state management-information storage section. Using this load-state management information, the common-use load-state management information and the individual-use load-state management information can be created at high speed and with ease.

It is preferable that: the above described program start-up unit further comprise a program update section which updates at least either of the program and the shared program stored in the program storage section; when at least either of the program and the shared program is updated by the program update section, the load execution section create load-state management information about the updated program or shared program and update the load-state management information stored in the load-state management-information storage section; the link-relation analysis section analyze the link relation between the updated program and shared program and update the structure of the link relation between the programs; the common link-relation extraction section update the information on the link relation usable in common by a plurality of programs based on the updated structure of the link relation; and based on the updated information on the link relation, the common load-state management-information creation section update the common-use load-state management information and the individual-use load-state management information, using the updated load-state management information.

In this case, when at least either of the program and the shared program has been updated, the common-use load-state management information and the individual-use load-state management information can be automatically updated. Therefore, even if the program or the shared program has been updated, the program can be started up at a higher speed, and at the same time, the consumption of a memory can be reduced.

The program start-up unit, the program start-up method, the recording medium in which a start-up processing program is recorded and the integrated circuit according to the present invention which are capable of, in each kind of equipment that executes a program in a computer, starting up the program at a higher speed and reducing the consumption of a memory. Therefore, they are useful for computer-incorporated equipment, such as an information device, an AV system, a communication device and a household appliance.

This application is based on Japanese patent application serial No. 2006-136045, filed in Japan Patent Office on May 16, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A program start-up unit which starts up an execution program, from among one or more execution programs, that is executed using a shared program, from among one or more shared programs, the program start-up unit comprising:
   a processor; and
   a memory,
   wherein the memory includes a common load-state management-information storage section which assorts and stores common-use load-state management information for managing a load state of a shared program used in common by each of the one or more execution programs and individual-use load-state management information for managing a load state of a shared program used individually by each of the one or more execution programs,
   wherein the processor functions as a load-state management-information assignment section which, when the execution program is started up and the shared program used to execute the execution program is loaded into an execution space:
      (i) assigns, using the common-use load-state management information stored in the common load-state management-information storage section, a management structure of the load state of the shared program used in common by each of the one or more execution programs to the execution space so that the management structure is referred to in common by each of the one or more execution programs; and
      (ii) assigns, using the individual-use load-state management information stored in the common load-state management-information storage section, a management structure of the load state of the shared program used individually by each of the one or more execution programs to the execution space so that the management structure is referred to individually by each of the one or more execution programs, and
   wherein the processor further functions as:
      a link-relation analysis section which analyzes a link relation between the execution program and the one or more shared programs, and creates a structure of the link relation between the execution program and the one or more shared programs;
      a common link-relation extraction section which extracts information on the link relation usable in common by the one or more execution programs, based on the structure of the link relation created by the link-relation analysis section;
      a load-state management-information storage section which stores load-state management information that represents a management structure of a load state at a time when the execution program and the shared program are loaded into the execution space; and
      a common load-state management-information creation section which, on the basis of the information on the link relation obtained from the common link-relation extraction section, assorts the common-use load-state management information and the individual-use load-state management information from the load-state management information of the load-state management-information storage section, and stores the common-use load-state management information and the individual-use load-state management information in the common load-state management-information storage section.

2. The program start-up unit according to claim 1, wherein when the execution program is started up and the shared program used to execute the execution program is loaded into the execution space, the load-state management-information assignment section assigns the management structure of the load state of the shared program used in common by each of the one or more execution programs to the execution space so that the common-use load-state management information stored in the common load-state management-information storage section is referred to by each of the one or more execution programs.

3. The program start-up unit according to claim 1, wherein:
   on the basis of the information on the link relation obtained from the common link-relation extraction section, the common load-state management-information creation section creates shared program link-relation information which represents a link relation with one or more shared programs necessary for executing the execution program, and stores this program link-relation information in the common load-state management-information storage section; and the processor further functions as
- a start-up detection section which detects the execution program being started up, and
- a link-information retrieval section which specifies the one or more shared programs necessary for executing the execution program detected by the start-up detection section by referring to the shared program link-relation information stored in the common load-state management-information storage section, and outputs the common-use load-state management information used in common by the execution program and the individual-use load-state management information used individually by the execution program from the common load-state management-information storage section to the load-state management-information assignment section.

4. The program start-up unit according to claim 3, wherein:
on the basis of the structure of the link relation created by the link-relation analysis section, the common link-relation extraction section extracts a group of shared programs to which this link relation is most common; and
the common load-state management-information creation section reads the load-state management information about the group of shared programs extracted by the common link-relation extraction section from the load-state management-information storage section, collects this load-state management information as the common-use load-state management information and stores the load-state management information in the common load-state management-information storage section.

5. The program start-up unit according to claim 4, wherein the common link-relation extraction section extracts the group of shared programs, based on at least either of a number of links to each shared program by the execution program and a total number of links to each shared program by a subordinate shared program thereof.

6. The program start-up unit according to claim 5, wherein on the basis of the structure of the link relation created by the link-relation analysis section, the common link-relation extraction section: calculates the number of links to a shared program by the execution program and a subordinate link number made when one is added to the total number of links to the shared program by a subordinate shared program thereof; specifies a shared program having a maximum value when the number of links to the shared program and the subordinate link number are multiplied together as the maximum shared program; and extracts the maximum shared program and a subordinate shared program of the maximum shared program as the group of shared programs.

7. The program start-up unit according to claim 4, wherein:
the common load-state management-information creation section stores the shared program link-relation information with identification information for specifying the group of shared programs in the common load-state management-information storage section; and
the link-information retrieval section refers to the identification information, and outputs the common-use load-state management information used in common by the execution program detected by the start-up detection section from the common load-state management-information storage section to the load-state management-information assignment section.

8. The program start-up unit according to claim 1, wherein:
the common load-state management-information storage section includes a non-volatile memory; and
the non-volatile memory stores the common-use load-state management information.

9. The program start-up unit according to claim 8, wherein the non-volatile memory includes a rewritable read-only memory.

10. The program start-up unit according to claim 1, wherein:
the common load-state management-information storage section includes a volatile memory; and
the volatile memory stores the individual-use load-state management information.

11. The program start-up unit according to claim 10, wherein the volatile memory includes a random-access memory.

12. The program start-up unit according to claim 1, wherein the memory further includes a program storage section which stores the execution program and the shared program used to execute the execution program; and
the processor further functions as a load execution section which creates load-state management information that represents the management structure of the load state at the time when the execution program and the shared program used to execute the execution program stored in the program storage section are loaded into an execution space, and stores the load-state management information in the load-state management-information storage section.

13. The program start-up unit according to claim 12, wherein the processor further functions as a program update section which updates at least either of the execution program and the shared program used to execute the execution program stored in the program storage section, and
when at least either of the execution program and the shared program used to execute the execution program is updated by the program update section:
(i) the load execution section creates load-state management information about the updated execution program or shared program used to execute the execution program and updates the load-state management information stored in the load-state management-information storage section;
(ii) the link-relation analysis section analyzes the link relation between the updated execution program and shared program used to execute the execution program and updates the structure of the link relation between the programs;
(iii) the common link-relation extraction section updates the information on the link relation usable in common by the one or more execution programs based on the updated structure of the link relation; and
(iv) based on the updated information on the link relation, the common load-state management-information creation section updates the common-use load-state management information and the individual-use load-state management information, using the updated load-state management information.

14. A program start-up method for starting up an execution program, from among one or more execution programs, which is executed using a shared program, from among one or more shared programs, the program start up method comprising:
a common load-state management-information storage step of assorting and storing common-use load-state management information for managing a load state of a shared program used in common by each of the one or more execution programs and individual-use load-state management information for managing a load state of a shared program used individually by each of one or more execution programs; and a load-state management-information assignment step of, when the execution program is started up and the shared program used to execute the execution program is loaded into an execution space:

(i) assigning, using the common-use load-state management information stored in the common load-state management-information storage step, a management structure of the load state of the shared program used in common by each of the one or more execution programs to the execution space so that the management structure is referred to in common by each of the one or more execution programs; and (ii) assigning, using the individual-use load-state management information stored in the common load-state management-information storage step, a management structure of the load state of the shared program used individually by each of the one or more execution programs to the execution space so that the management structure is referred to individually by each of the one or more execution programs;

a link-relation analysis step of analyzing a link relation between the execution program and the one or more shared programs, and creates a structure of the link relation between the execution program and the one or more shared programs;

a common link-relation extraction step of extracting information on the link relation usable in common by the one or more execution programs, based on the structure of the link relation created by the link-relation analysis step;

a load-state management-information storage step of storing load-state management information that represents a management structure of a load state at a time when the execution program and the shared program are loaded into the execution space; and a common load-state management-information creation step of, on the basis of the information on the link relation obtained from the common link-relation extraction step, assorting the common-use load-state management information and the individual-use load-state management information from the load-state management information of the load-state management-information storage step, and storing the common-use load-state management information and the individual-use load-state management information in the common load-state management-information storage step.

15. A non-transitory computer-readable recording medium stores a start-up processing program for starting up an execution program, from among one or more execution programs, which is executed using a shared program, from among one or more shared programs, wherein when executed, the start-up processing program allows a computer to function as:

a common load-state management-information storage section which assorts and stores common-use load-state management information for managing a load state of a shared program used in common by each of the one or more execution programs and individual-use load-state management information for managing a load state of a shared program used individually by each of the one or more execution programs;

a load-state management-information assignment section which, when the execution program is started up and the shared program used to execute the execution program is loaded into an execution space:

(i) assigns, using the common-use load-state management information stored in the common load-state management-information storage section, a management structure of the load state of the shared program used in common by each of the one or more execution programs to the execution space so that the management structure is referred to in common by each of the one or more execution programs; and (ii) assigns, using the individual-use load-state management information stored in the common load-state management-information storage section, a management structure of the load state of the shared program used individually by each of the execution programs to the execution space so that the management structure is referred to individually by each of the one or more execution programs;

a link-relation analysis section which analyzes a link relation between the execution program and the one or more shared programs, and creates a structure of the link relation between the execution program and the one or more shared programs;

a common link-relation extraction section which extracts information on the link relation usable in common by the one or more execution programs, based on the structure of the link relation created by the link-relation analysis section;

a load-state management-information storage section which stores load-state management information that represents a management structure of a load state at a time when the execution program and the shared program are loaded into the execution space; and a common load-state management-information creation section which, on the basis of the information on the link relation obtained from the common link-relation extraction section, assorts the common-use load-state management information and the individual-use load-state management information from the load-state management information of the load-state management-information storage section, and stores the common-use load-state management information and the individual-use load-state management information in the common load-state management-information storage section.

16. An integrated circuit which starts up an execution program, from among one or more execution programs, that is executed using a shared program, from among one or more shared programs, the integrated circuit comprising:

a common load-state management-information storage section which assorts and stores common-use load-state management information for managing a load state of a shared program used in common by each of the one or more execution programs and individual-use load-state management information for managing a load state of a shared program used individually by each of the one or more execution programs;

a load-state management-information assignment section which, when the execution program is started up and the shared program used to execute the execution program is loaded into an execution space:

(i) assigns, using the common-use load-state management information stored in the common load-state management-information storage section, a management structure of the load state of the shared program used in common by each of the one or more execution programs to the execution space so that the management structure is referred to in common by each of the one or more execution programs; and (ii) assigns, using the individual-use load-state management information stored in the common load-state management-information storage section, a management structure of the load state of the shared program used individually by each of the execution programs to the execution space so that the management structure is referred to individually by each of the one or more execution programs;

a link-relation analysis section which analyzes a link relation between the execution program and the one or more shared programs, and creates a structure of the link relation between the execution program and the one or more shared programs;

a common link-relation extraction section which extracts information on the link relation usable in common by the one or more execution programs, based on the structure of the link relation created by the link-relation analysis section;

a load-state management-information storage section which stores load-state management information that represents a management structure of a load state at a time when the execution program and the shared program are loaded into the execution space; and a common load-state management-information creation section which, on the basis of the information on the link relation obtained from the common link-relation extraction section, assorts the common-use load-state management information and the individual-use load-state management information from the load-state management information of the load-state management-information storage section, and stores the common-use load-state management information and the individual-use load-state management information in the common load-state management-information storage section.

* * * * *